United States Patent
Hameleers et al.

(10) Patent No.: US 6,760,325 B1
(45) Date of Patent: Jul. 6, 2004

(54) PROCESSING OF MOBILE ORIGINATED CALLS IN PACKET SWITCHED PROTOCOL BASED COMMUNICATION NETWORKS

(75) Inventors: Heino Hameleers, Kerkrade (NL); Frank Hundscheidt, Kerkrade (NL); Eric Valentine, Plano, TX (US); Helena Odling, Stockholm (SE); Stephen Terill, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/532,416

(22) Filed: Mar. 22, 2000

(30) Foreign Application Priority Data

Mar. 24, 1999 (EP) .............................................. 99105879

(51) Int. Cl.[7] .......................... H04L 12/66; H04L 12/56
(52) U.S. Cl. ........................ 370/352; 370/401; 370/410
(58) Field of Search ................................. 370/338, 401, 370/230, 465, 385, 352

(56) References Cited

U.S. PATENT DOCUMENTS

| | | | |
|---|---|---|---|
| 5,475,689 A | | 12/1995 | Kay et al. |
| 6,104,929 A | * | 8/2000 | Josse et al. ................. 455/445 |
| 6,415,151 B1 | * | 7/2002 | Kreppel ...................... 455/445 |
| 6,434,140 B1 | * | 8/2002 | Barany et al. .............. 370/352 |
| 6,469,998 B1 | * | 10/2002 | Burgaleta Salinas et al. .......................... 370/338 |
| 6,487,209 B1 | * | 11/2002 | Valentine et al. ........... 370/401 |
| 6,522,629 B1 | * | 2/2003 | Anderson, Sr. ............. 370/236 |

FOREIGN PATENT DOCUMENTS

| | | |
|---|---|---|
| EP | 0910198 A2 | 4/1999 |
| WO | WO 98/36612 A | 8/1998 |
| WO | WO98/36612 | 8/1998 |

OTHER PUBLICATIONS

Barel, C.; European Search Report, App. No. EP 99105879, Aug. 24, 1999, pp. 1–3.
Barel, C., International Search Report, Intenational App. No. PCT/EP/02491, Aug. 11, 2000, pp. 1–3.

* cited by examiner

*Primary Examiner*—Hassan Kizou
*Assistant Examiner*—Timothy Lee

(57) ABSTRACT

A method is disclosed for processing a mobile originating telephone call in a packet switched protocol based communication network comprising a packet switched protocol based cellular telephone network having a first layer for transferring signaling information assigned to the telephone call being processed by the communication network, a second layer for transferring payload information assigned to the telephone call, and an interface for coupling the cellular telephone network to a further network.

24 Claims, 2 Drawing Sheets

Figure 1:
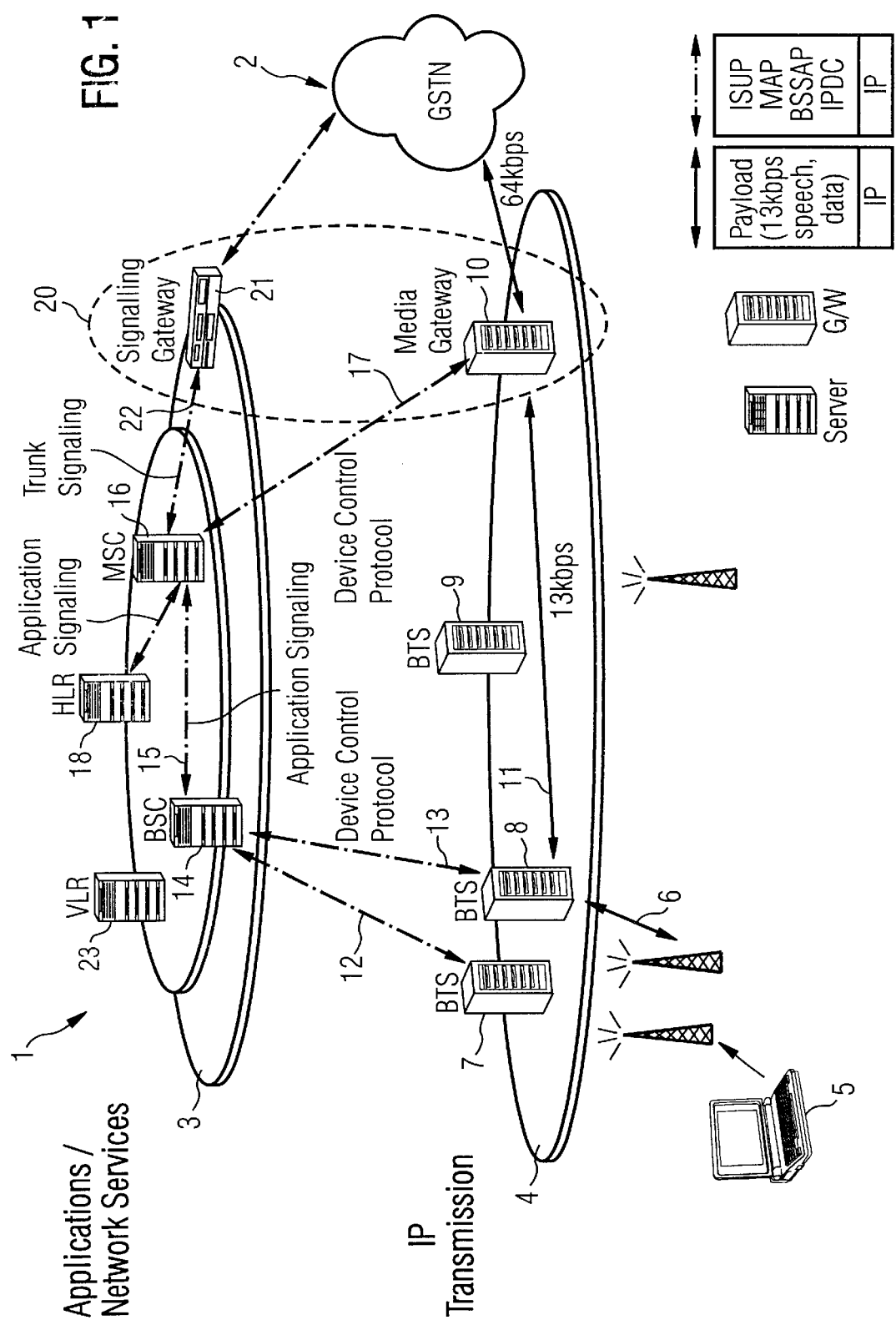

PROCESSING OF MOBILE ORIGINATED CALLS IN PACKET SWITCHED PROTOCOL BASED COMMUNICATION NETWORKS

The present invention relates to a method for processing of mobile originated calls in a packet switched protocol based communication network that comprises a packet switched protocol based cellular telephone network, for instance, a GSM network, and a further network, for instance, a packet switched protocol network or a general switched telephone network (GSTN) that is coupled to the cellular telephone network by means of an interface comprising a signalling information exchange function and a call or payload information exchange function between the cellular telephone network and the GSTN.

Recently, there have been made attempts in a more and more increasing manner to couple and to integrate a mobile cellular telephone network, for instance, the GSM network, that is generally a circuit switched network to a further kind of networks, called packet switched networks, for instance, an internet protocol network or VOIP (Voice on Internet Protocol) network, wherein call information is transferred in the form of "packets" between the called member and the calling member and vice versa. The packet switched network uses several different ways or through-connections in order to transfer the packets between the users, whereas in the circuit switched world, for instance, the GSM network, a through-connection is established within the network and, as long as the through-connection is maintained, the whole call information including signalling and payload information is transferred via the through-connection in the circuit switched network between the users.

A through-connection in a communication network that comprises, for instance, a GSM network or a similar cellular telephone network and an internet protocol network as GSTN being coupled with each other by interface means is established in the conventional cellular telephone network always via a base transceiver station, a base station controller and a mobile services switching centre to the interface that in turn is coupled to the internet protocol network or packet switched network. Some delay is introduced into transferring the call information, payload or signalling information on the side of the conventional cellular telephone network which renders the known architecture of the cellular telephone network improper or not very well suited for coupling to a packet switched network, for instance, an internet protocol network or similar network. In addition, the delay on the cellular telephone network side causes often a delay on the packet switched network side that lowers the overall network performance.

It is, therefore, an object of the present invention to provide a method for processing mobile originating calls in a packet switched protocol based or Internet protocol based communication network which minimises the delay problems and bandwidth requirements.

This object is solved by the method of claim 1 and by the communication network. Accordingly, the inventive method for processing a mobile originated call in a packet switched protocol based communication network comprising an packet switched protocol based cellular telephone network having a first layer for transferring signalling information assigned to the call being processed by the communication network, a second layer for transferring payload information assigned to the call, and interface means for coupling the cellular telephone network to a further network or general switched telephone network, the interface means comprising a signalling information exchange function and a payload information exchange function between the cellular telephone network and the further network, the first layer and the second layer of the cellular telephone network being coupled to the interface means, and the second layer comprising at least one base node to be coupled to at least one mobile station from which the telephone call originates, to the first layer and to the interface means, the method comprising: after initiating the processing of a call, exchanging address information identifying the base node within the cellular telephone network and identifying the interface means within the cellular telephone network between the base node and the interface means via the first layer and under control of the first layer in order to establish a through-connection within the second layer for transferring payload information of the call from the base node to the interface means and vice versa on the basis of the address information.

Since in the invention the payload of a call is routed directly within the second layer of the packet switched protocol based or IP (Internet Protocol) based cellular telephone network to or from the interface means the payload information is not transferred via the longer and more time consuming way of the conventional systems, i.e., for instance, the mobile services switching center of a conventional GSM network, and, therefore, a corresponding delay in the cellular telephone network and the delay problems involved therewith are minimised or they are avoided.

Directing the payload of the call only within the second layer, e.g. between a base station transceiver as base node and a media gateway of the interface means, is ensured since the invention establishes a network unique addressing of the base node and the interface means by using the corresponding base node address or base transceiver station address and the interface means address or media gateway address.

Further, by routing the payload information directly from the base station transceiver to the interface means, for instance, the media gateway, the bandwidth requirements for transferring the payload information are minimised.

The cellular telephone network can be, for instance, a GSM network. The further network can be or can comprise a packet switched protocol based network, for instance, the Internet, a VOIP network, an Internet Protocol network, a GPRS network or a UMTS network, or the further network can be or comprise a circuit switched network or circuit switched protocol based telephone network, for instance, a ISDN network, a PLMN network or a PSTN network.

The Communication network of the present invention comprises a packet switched protocol based cellular telephone network having a first layer for transferring signalling information assigned to a call being processed by the communication network, a second layer for transferring payload information assigned to the call, and interface means for coupling the cellular telephone network to a further network, the interface means comprises a signalling information exchange function and a payload information exchange function between the cellular telephone network and the further network, the first layer and the second layer of the cellular telephone network being coupled to the interface means, and the second layer comprising at least one base node to be coupled to at least one mobile station from which the call originates, to the first layer and to the interface means, wherein the first layer controls and transfers an exchange of address information identifying the base node within the cellular telephone network and identifying the interface means within the cellular telephone network between the base node and the interface means in order to establish a through-connection within the second layer for transferring payload information of the call from the base node to the interface means and/or vice versa on the basis of the address information.

Figure 2:
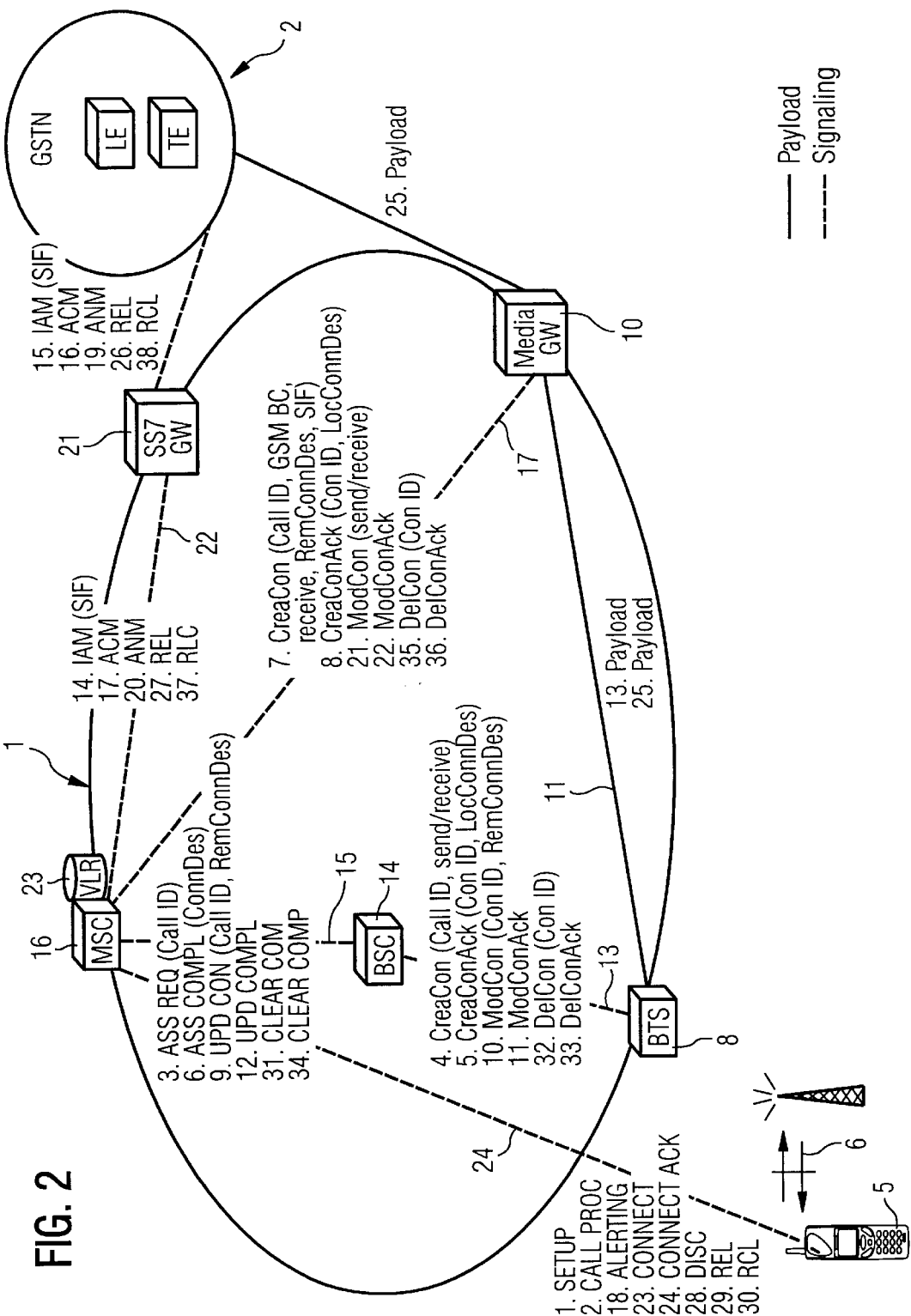

Further objects, advantages, advantageous improvements and applications of the invention are mentioned in the following description of a preferred embodiment of the invention in connection with the enclosed figures that show:

FIG. 1 a schematic block diagram of a packet switched protocol based communication network that has a packet switched protocol based GSM network being coupled to a GSTN network (General Switched Telephone Network); and FIG. 2 a signalling flow example for illustrating and explaining an embodiment of the inventive method for processing a mobile originated call in the packet switched protocol based communication network shown in FIG. 1.

In the FIG. 1 a schematic block diagram of a new packet switched protocol based communication network is shown which comprises a packet switched protocol based cellular telephone network 1 and a further network or GSTN network 2 that is coupled to the cellular telephone network 1 by means of an interface 20, and on which the inventive method is implemented. In the following the invention is described by example using an Internet protocol based GSM network as cellular telephone network 1.

The cellular telephone network 1 is divided into a first layer 3 or level, also called an application or signalling information processing and transferring platform, comprising application and network service functions, and into a second layer 4 or level, also called a transmission or payload information transferring platform, that comprises call information transmission or payload transmission, for instance, in an internet protocol format. Further interface means 20 are provided in order to couple the cellular telephone network 1 to the GSTN network 2 for bi-directional information and signalling exchange between these networks.

The interface means can comprise a media gateway for payload information exchange between the cellular telephone network 1 and the GSTN network 2 and to be coupled directly to base transceiver stations of the second layer 4. Accordingly, in the invention, a part of the functions of a mobile services switching center of the state of the art, more specifically the payload information transfer function, is established in the interface means of the packet switched based cellular telephone network 1, i.e. the media gateway, whereas the other functions, particularly the call signalling function and control functions, are maintained and carried out in the first layer 3 by means of the first layer, for instance, in the mobile services switching center 16. In this regard the cellular telephone network 1 provides a so-called "distributed mobile services switching center", since the control and transfer of payload information, as mentioned above, is moved from the conventional mobile services switching center to the media gateway of the interface means of the Internet protocol based GSM network.

The second layer 4 of the GSM network comprises several base transceiver stations (BTS) 7, 8 and 9. Each base transceiver station 7, 8, 9 houses the radio transceivers that define a cell being assigned to a cell area and handles a radio link protocol 6 that is the connection to a number of fixed or mobile stations 5 existing in the corresponding cell area.

As shown in FIG. 1 on the second layer 4, the base transceiver station 8 is connected by means of a direct connection 11 or route, also called a through-connection, to a media gateway 10 of the interface means 20. The base transceiver station, therefore, comprises the functionality and protocol for sending and receiving call and payload information from or to the media gateway 10 via the direct protocol connection 11. Further, in order to serve the device control protocol connection 13 between the base transceiver station 8 and the base station controller 14, control protocol software is implemented on both the base transceiver station 8 and the base station controller 14 on the basis of DCP (Device Control Protocol), for example MGCP (Media Gateway Control Protocol) and MDCP (Media Device Control Protocol) protocols.

The media gateway 10 substantially provides a payload conversion between the packet switched GSM network (GSM Global System for Mobile telecommunication) 1 and the GSTN network 2, e.g. a packet switched protocol based network or circuit switched protocol based network. The media gateway 10 of the interface means 20 comprises devices such as transcoders, modems, a network access server etc. Since the transcoders are provided within the media gateway 10 of the interface 20, the bandwidth requirements are minimised. Further the media gateway 10 comprises the functionality and control software being required for transferring payload or call information directly to the base transceiver stations 7, 8, 9. On the direct connection 11 from the base transceiver station 8 to the media gateway 10 payload information is transferred with a rate, for instance, of 13 kbps. On the connection from the media gateway 10 to the GSTN network the transmission rate corresponds to, for instance, 64 kbps.

The first layer 3 of the IP based GSM cellular telephone network 1 comprises a number of base station controllers, wherein in the FIG. 1 one base station controller 14 is shown, a number of mobile services switching centres, wherein one mobile switching center 16 is shown in FIG. 1, a home location register 18 (HLR) and a number of visitor location registers (VLR) wherein only one visitor location register 23 is shown in the FIG. 1. The home location register 18 contains all the administrative information of each subscriber registered in the GSM network along with the current VLR-location of the mobile stations 5. The visitor location register 23 contains selected administrative information from the home location register 18 necessary for call control and provision of the subscribed services for each fixed station or mobile station 5 currently located in the geographical area controlled by the visitor location register 23. The home location register 18 and the visitor location register 23 together with the mobile services switching center 16 provide the call routing and possibly international roaming capabilities of the GSM network. Further units, for instance, the equipment identity register that contains a list of valid mobile equipment on the GSM network and an authentication centre are not shown in the figures.

The base station controller 14 and the mobile services switching centre 16 are connected via an application signalling protocol connection 15 and the mobile services switching centres 16 is also connected to the home location register 18 via an application signalling protocol connection. The application signalling protocol connection 15 is, for instance, implemented on the basis of the known MAP or BSSMAP protocols.

The mobile services switching centre 16 is the main component of the layer 3 and provides all the functionality needed to handle a mobile subscriber or a mobile station 5, such as registration, authentication, location updating and call routing to a roaming subscriber. Further, in the mobile services switching center 16 a MSC device control protocol is implemented for controlling the media gateway 10 of the interface means 20 via a MSC device control protocol connection 17 between the media gateway 10 and the mobile services switching center 16. For instance, this MSC device control protocol can be implemented in the mobile services switching center 16 on the basis of a device control protocol (DCP).

Further on the layer 3 of the GSM network a signalling gateway 21, for instance, a SS7 gateway (SS7=Signalling System No. 7), as part of the interface means 20 is shown which, for instance, provides bearer signalling conversions between circuit or packet switched protocols and packet switched protocols or vice versa. It may also provide application level signalling conversions between different protocols. The signalling gateway 21 is connected to the GSTN network via an interface protocol connection. A number of options for operating and connecting interface means to an internet protocol network or to the GSTN network 2 are described in detail in the internet draft, draft-ietf-megaco-reqs-oo.txt on http://www.ietf.cnri.reston.va.us/ID.html, having the title "Media Gateway Control Protocol Architecture and Requirements", dated January 1999. Further the signalling gateway 21 of the interface means 20 is connected to the mobile services switching center 16 by means of a trunk signalling protocol connection, for instance, ISUP, as shown with the reference sign 22 in FIG. 1. For further detailed information on the packet switched protocol based communication network reference is made to the specification "Basic architecture for packet switched protocol based GSM networks" filed by and assigned to the same applicant as the present specification.

In the following, the procedures and steps are explained which are carried out for processing a mobile originated call in the packet switched protocol based communication network being illustrated in FIG. 1. The essential steps of the processing are shown by numbers 1. to 38. in the FIG. 2.

In step 1. "SETUP", the mobile station 5 initiates a new call or dial up access procedure by requesting a call set-up that is forwarded by means of a DTAP-protocol connection to the mobile services switching centre 16 of the first layer of the IP based GSM network 1. DTAP means direct transfer application part and is a function within a protocol layer for communication and signalling between the mobile station 5 and the mobile services switching centre 16. This direct protocol connection is illustrated by the DTAP protocol connection 24 in FIG. 2. The physical connection from the mobile station 5 to the mobile services switching centre 16 and vice versa is realised via the radio link 6, the base transceiver station 8 and the base station controller 14 to the mobile services switching centre 16 in upward direction and in downward direction via the units 14, 8 and 6 to the mobile station 5. Accordingly, in the following description of the present invention, mentioning of the DTAP protocol connection 24 always means, that signals and information of the DTAP protocol have to pass the base station controller 14, the base transceiver station 8 and the radio link 6.

Afterwards, in step 2., "CALL PROC" (Call Proceeding), after receiving the call set up request from the mobile station 5, the mobile services switching centre 16 acknowledges the call set up request from the mobile station 5 by sending a call proceeding message via the DTAP protocol connection 24 to the mobile station 5.

Further in step 3., "ASS REQ" the mobile services switching centre 16 generates and stores a network unique call identification (call ID) and forwards an assignment request including the call identification via the application signalling connection 15 to the base station controller 14 in order to request for a traffic channel from the base station controller 14. An application signalling protocol is provided that, for instance, is based on a traditional GSM application protocol like BSSMAP (Base Station System Management Application Part) which now, however, in the packet switched protocol based GSM network 1 is carried for instance, over TCP/IP protocols (Transmission Control Protocol/Internet Protocol). For instance, in the presently described embodiment of the invention, the application signalling connection 15 is performed on the BSSMAP protocol and signalling that is extended by the UPD CON/COMPL (Update Connection/Complete) interface.

Afterwards, during step 4. "CreaCon", the base station controller 14 stores the call identification and forwards a create connection request to the base transceiver station 8 in order to reserve hardware and software resources for a new connection assigned to the call initiated by the mobile station 5. The signalling between the base station controller 14 and the base transceiver station 8 is carried out via the device control connection 13 by means of a device control protocol. The base station controller 14 includes a through-connection indicator that indicates a both-way through-connection between the base transceiver station 8 and a further unit in the GSM network 1, for instance, the gateway 10 or further gateways of the GSM network 1, into the create connection request transferred to the base transceiver station 8.

Next, in step 5. "CreaConAck", the base transceiver station 8 then reserves the applicable resources in accordance to the create connection request from the base station controller 14 and maps the call identification into a BSC-BTS internal connection identification. Further the base transceiver station 8 includes BTS address information or local connection description into a create connection acknowledge message to be sent to the base station controller 14 via the device control connection 13 by the device control protocol (DCP). The BTS address information is a reference by which another node, for instance, the media gateway 10, of the GSM network 1 can address the base transceiver station 8 and the call individual, for instance, the mobile station 5, within the base transceiver station 8.

After receiving the create connection acknowledge information from the base transceiver station 8, in step 6. "ASS COMPL", the base station controller stores the BSC-BTS internal connection ID and sends an assignment complete acknowledge information to the mobile services switching centre 16 in order to acknowledge the traffic channel assignment request to the mobile services switching centre 16. The assignment complete acknowledge message comprises the BTS address information. The step 6. again is supported by the BSSMAP protocol.

In the next step 7. "CreaCon", the mobile services switching centre 16 sends a create connection request via the MSC device control protocol connection that in the present embodiment is supported by the device control protocol (DCP), to the media gateway 10 of the interface means 20. The create connection request from the mobile services switching centre includes a through-connection indicator that indicates a backward through-connection, the BTS address information, a GSM bearer capability and a selected signalling information field.

After receiving the create connection request from the mobile services switching centre (MSC) 16, in step 8. "CreaConAck", the media gateway (MG) 10 reserves the applicable or corresponding resources for the create connection request and maps the call identification in a MG-MSC internal connection identification. The media gateway 10 then generates a create connection acknowledge information to be sent back to the mobile services switching centre 16 via the MSC device control protocol connection supported for instance by the device control protocol (DCP).

The media gateway 10 includes a MG address information or MG local connection description into the create connection acknowledgement information. The MG address information is a reference by which another node within the GSM network 1 can address the media gateway 10 and the call individual within the media gateway 10. Further the create connection acknowledge information comprises the MG-MSC internal connection identification.

After receiving the create connection acknowledge information from the gateway 10, the mobile services switching centre stores the MG-MSC internal connection ID received from the media gateway 10 and forwards an update connection request via the application signalling connection 15 to the base station controller 14. The update connection request from the mobile services switching centre comprises the MG address information from the media gateway 10. This step 9. is supported by the new BSSMAP protocol established between the mobile services switching centre 16 and the base station controller 14.

Next in step 10., the base station controller 14 sends a modify connection request via the device control connection supported by the device control protocol (DCP) to the base transceiver station 8. The modify connection request comprises the MG address information.

Then in step 11., "ModConAck", the base transceiver station 8 issues a modify connection acknowledge message back to the base station controller 14, again supported by device control protocol (DCP), via the device control connection 13 in order to acknowledge the modification to the base station controller 14.

In step 12., "UPD COMPL", the base station controller 14 then acknowledges the update connection request from the mobile services switching centre 16 by forwarding an update complete acknowledge message via the application signal connection 15 supported by the BSSMAP protocol to the mobile services switching centre 16 in order to inform the mobile services switching centre 16 about the completion of the requested modification.

After step 12., in step 13., a backward through-connection has been established within the GSM network 1, wherein the backward through-connection is established directly between the media gateway 10 that comprises the BTS address information from the base transceiver station 8 via the direct connection 11 to the base transceiver station 8 without using the path via the mobile services switching centre 16 and the base station controller 14, in order to transfer information or payload in backward direction, i.e. from the media gateway 10 to the base transceiver station 8.

In step 14., called "IAM (SIF)", the mobile services switching centre 16 forwards an initial address message via the trunk signalling protocol connection 22 that, for instance, is supported by ISUP (ISDN User Part), to the signalling gateway 21, for instance, a SS7 gateway, in order to set-up the new call to the GSTN via the signalling gateway 21. This initial address message comprises a signalling information field (SIF) that indicates adjacent nodes, trunk and timeslots.

After receiving the initial address message from the mobile services switching centre 16, in step 15., "IAM (SIF)", the signalling gateway 21 transfers or relays the initial address message to the GSTN network 2 via a signalling connection between the signalling gateway 21 and the GSTN 2, wherein the signalling gateway 21 only converts the signalling bearer for adaptation to the requirements and protocols of the GSTN network 2.

Next, in step 16. "ACM", the GSTN network 2 acknowledges the call set-up to the signalling gateway 21 by sending an address complete message via the signalling connection that for instance is supported by the ISUP protocol. Afterwards, in step 17., "ACM", the signalling gateway 21 forwards the address complete message to the mobile services switching centre 16, again via the trunk signalling protocol connection 22 supported by ISUP, wherein the signalling gateway 21 only converts the signalling bearer.

In the following step 18., "ALERTING" the mobile services switching centre 16 informs the mobile station 5 about the call set-up acknowledgement from the GSTN 2 by forwarding an alerting message via the DTAP protocol connection 24 to the mobile station 5.

In step 19., "ANM", the GSTN network 2 informs the signalling gateway 21 about the answer of the called node or party within the GSTN network 2 by sending an answer message via the signalling connection between the GSTN network 2 and the signalling gateway 21 to the signalling gateway 21. The transfer of the answer message is again supported by the ISUP protocol.

Afterwards in step 20. called "ANM", the signalling gateway 21 forwards the answer message, after converting the signalling bearer, via the trunk signalling protocol connection 22 supported by the ISUP protocol to the mobile services switching centre 16.

In step 21. the mobile services switching centre 16 forwards a modify connection request via the MSC device control protocol connection 17 supported by device control protocol (DCP) to the media gateway 10 in order to prepare a both-way through-connection between the media gateway 10 and the base transceiver station 8.

Afterwards in step 22., the media gateway 10 establishes and performs the requested both-way through-connection and sends a modify connection acknowledgement command or signal back to the mobile services switching centre 16, again via the MSC device control connection 17 being supported by the device control protocol (DCP) in order to acknowledge establishing of the both-way through-connection to the mobile services switching centre 16.

Next, in step 23., "CONNECT", the mobile services switching centre 16 sends a connect request message to the mobile station 5 via the DTAP protocol connection 24 in order to inform the mobile station 5 about the answer of the called party of the GSTN network 2.

The mobile station 5 then sends a connect acknowledge message back to the mobile services switching centre 16, again via the DTAP protocol connection 24, in order to acknowledge the connection to the mobile services switching centre 16. This step 24., is designated by "CONNECT ACK" in FIG. 2.

Afterwards, in step 25., a full both-way through-connection has been established within the communication network of the invention between all nodes involved in this call, which nodes, for instance, are the mobile station 5, the base transceiver station 8, the media gateway 10 and the called party within the GSTN 2. Now payload of the call and related information can be transferred directly between the base transceiver station 8 and the media gateway 10 in both directions, which means, that payload of the call can be transferred between the mobile station 5 from which the call originates and the called party, user or node within the GSTN 2 in both directions via the radio link 6, the base transceiver station 8, the direct connection 11, the media gateway 10, the payload connection between the GSTN 2 and the media gateway 10 and vice versa.

In the following, the procedures for releasing the established both-way through-connection are described wherein the steps 26. to 38. of FIG. 2 are involved.

In step 26., the GSTN network 2 sends a release message via the signalling connection to the signalling gateway 21 in order to release the both-way through-connection assigned to the established call. The step 26. again is supported by the ISUP protocol and is initiated by the called party or node in the GSTN network 2.

Afterwards in step 27. "REL", the signalling gateway 21 forwards the release message, after converting only the signalling bearer, via the trunk signalling protocol connection 22 being supported by the ISUP protocol to the mobile services switching centre 16.

Then in step 28., "DISC", the mobile services switching centre 16 forwards a disconnect request via the DTAP protocol connection 24 to the mobile station 5 in order to request disconnection or releasing of the present call. Afterwards in step 29., "REL" the mobile station 5 forwards a release request via the DTAP protocol connection 24 to the mobile services switching centre 16 in order to request a call release from the mobile services switching centre 16. Next the mobile services switching centre 16 sends a release complete acknowledge message back to the mobile station 5, again via the DTAP protocol connection 24, in order to acknowledge the call release to the mobile station 5 (step 30.).

In step 31., the mobile services switching centre 16 then forwards a clear command via the application signalling connection supported by the BSSMAP protocol to the base station controller 14 in order to request releasing the occupied call resources assigned to the call to be released.

Then, in step 32. "DelCon", the base station controller 14 forwards a delete connection request to the base transceiver station 8 via the device control connection 13 supported by the device control protocol (DCP) in order to request the release of the call resources assigned to the call to be released.

In step 33. "DelConAck", the base transceiver station 8 then acknowledges the call release to the base station controller 14 by sending a delete connection acknowledge command back to the base station controller 14, again via the device control connection 13 supported by device control protocol (DCP)

Next in step 34., "CLEAR COMP" the base station controller sends a clear complete command back to the mobile services switching centre 16 via the application signalling connection 15 in order to acknowledge the call release to the mobile services switching centre 16.

In the next step 35. "DelCon", the mobile services switching centre 16 forwards a delete connection request via the MSC device control protocol connection 17 supported by the device control protocol (DCP) to the media gateway 10 in order to request the release of the call resources occupied by the media gateway 10 and assigned to the established call to be released.

In step 36., "DelConAck", the media gateway 10 then forwards a delete connection acknowledge command back to the mobile services switching centre 16, again via the MSC device control protocol connection 17 supported by the device control protocol (DCP), in order to acknowledge the call release to the mobile services switching centre 16.

Afterwards the mobile services switching centre 16 forwards a release complete message via the trunk signalling protocol connection 22 supported by the ISUP protocol to the signalling gateway 21 in order to confirm call release. (see step 37. "RLC"). Subsequently, the signalling gateway 21 sends a release complete message over the signalling connection to the GSTN 2, after converting only the signalling bearer, in order to inform the GSTN 2 about the complete release of the call. The release complete message is supported by the ISUP protocol.

What is claimed is:

1. Method for processing a mobile originated call in a packet switched protocol based communication network comprising a packet switched protocol based cellular telephone network having a first layer for transferring signaling information assigned to the call being processed by the communication network wherein the first layer comprises a mobile services switching center and a base station controller being connected to the mobile services switching center, a second layer for transferring payload information assigned to the call, and interface means for coupling the cellular telephone network to a further network, the interface means comprising a signaling information exchange function and a payload information exchange function between the cellular telephone network and the further network, the first layer, and the second layer of the cellular telephone network being coupled to the interface means, and the second layer comprising at least one base node to be coupled to at least one mobile station from which the call originates, to the first layer and to the interface means, the method comprising:

after initiating the processing of the call, exchanging address information identifying the base node within the cellular telephone network and identifying the interface means within the cellular telephone network between the base node and the interface means via the first layer and under control of the first layer in order to establish a through-connection within the second layer for transferring payload information of the call from the base node to the interface means and vice versa on the basis of the address information, after initiating the call by the mobile station, generating a network unique call identification assigned to the initiated call by the mobile services switching center, forwarding an assignment request including the call identification from the mobile services switching center to the base station controller (BSC) in order to request for a traffic channel from the base station controller.

2. Method of claim 1, wherein the base node comprises a base transceiver station (BTS), the method further comprising:

forwarding a create connection request including the call identification from the base station controller to the base transceiver station in order to reserve hardware and software resources for a new connection assigned to the call initiated by the mobile station.

3. Method of claim 2, further comprising:

providing a through-connection indicator by the base station controller, the through-connection indicator indicating a both-way through-connection between the base transceiver station and a further unit in the cellular telephone network; and including the through-connection indicator into the create connection request to be transferred to the base transceiver station.

4. Method of claim 3, further comprising:

after receiving the create connection request from the base station controller, mapping the call identification into a BSC-BTS internal connection identification by the base transceiver station.

5. Method of claim 4, further comprising:

after receiving the create connection request from the base station controller, providing a BTS address as base node address information by the base transceiver station, and forwarding a create connection acknowledge message including the BTS address from the base transceiver station to the base station controller.

6. Method of claim 5, further comprising:

after receiving the create connection acknowledge message from the base transceiver station, storing the BSC/IBTS internal connection identification in the base controller station; and sending an assignment complete acknowledge message comprising the BTS address to the mobile services switching center in order to acknowledge the traffic channel assignment request to the mobile services switching center.

7. Method of claim 6, further comprising:

after receiving the assignment complete message from the base station controller, forwarding a create connection request including a through-connection indicator that indicates a backward-through connection, the BTS address, a bearer capability and a signaling information field from the mobile services switching center to a media gateway of the interface means.

8. Method of claim 7, further comprising:

after receiving the create connection request from the mobile services switching center, providing a MG (Media Gateway) address as interface means address information in the media gateway, the MG address is a reference by which another node within the cellular telephone network can address the media gateway and the call identification within the media gateway, and forwarding a create connection acknowledge message including the MG address from the media gateway to the mobile services switching center.

9. Method of claim 8, further comprising:

after receiving the create connection request from the mobile services switching center, mapping the call identification in a MG-MSC internal connection identification; and including the MG-MSC internal connection identification into the create connection acknowledge message.

10. Method of claim 9, further comprising:

after receiving the create connection acknowledge message from the media gateway, forwarding an update connection request including the MG address to the base station controller.

11. Method of claim 10, further comprising:

after receiving the create connection acknowledge message from the gateway, storing the MG-MSC internal connection identification in the mobile services switching center.

12. Method of claim 11, further comprising:

after receiving the create connection acknowledge message from the gateway, forwarding an update connection request comprising the MG address to the base station controller.

13. Method of claim 12, further comprising:

after receiving the update connection request from the mobile services switching center, sending a modify connection request comprising the MG address from the base station controller to the base transceiver station, and, after receiving the modify connection request from the base station controller, sending a modify connection acknowledge message from the base transceiver station to the base station controller.

14. Method of claim 13, further comprising:

after receiving the modify connection acknowledge message from the base transceiver station, forwarding an update complete acknowledge message from the base station controller to the base transceiver station in order to cause the through-connection from the media gateway.

15. Method of claim 1, further comprising:

forwarding an initial address message within the first layer to the interface means, the initial address message comprises information referring to a called party within the further network;

transferring the initial address message from the interface means to the further network;

forwarding an address complete message from the further network to the interface means;

forwarding the address complete message from the interface means to the first layer;

forwarding an answer message from the further network via the interface means to the first layer, the answer message comprises information about an answer of the called party or node within the further network; and forwarding a modify connection request from the first layer to the interface means in order to cause a both-way through-connection from the interface means to the base node and vice versa within the second layer.

16. Method of claim 15, wherein the first layer comprises at least one mobile services switching center and the interface means comprises a signaling gateway being connected to the mobile services switching center and to the further network, the method further comprising:

forwarding the initial address message including a signaling information field referring to the called node within the further network from the mobile services switching center to the signaling gateway.

17. Method of claim 16, further comprising:

after receiving the initial address message, converting a signaling bearer in the signaling gateway; and transferring the initial address message from the signaling gateway to the further network.

18. Method of claim 17, further comprising:

after receiving the initial address message from the signaling gateway, forwarding the address complete message from the further network to the signaling gateway;

converting the signaling bearer in the signaling gateway; and forwarding the address complete message from the signaling gateway to the mobile services switching center in order to acknowledge a call set-up to the mobile services switching center.

19. Method of claim 18, further comprising:

after receiving the address complete message from the signaling gateway, forwarding an alerting message from the mobile services switching center to the mobile station in order to inform the mobile station about the call set-up acknowledge from the further network.

20. Method of claim 19, further comprising;

forwarding an answer message from the further network to the signaling gateway;

converting the signaling bearer in the signaling gateway and then forwarding the answer message from the signaling gateway to the mobile services switching center.

21. Method of claim 20, further comprising:

after receiving the answer message from the signaling gateway, forwarding a modify connection request from the mobile services switching center to a media gateway of the interface means in order to request the both-way through-connection.

22. Method of claim 21, further comprising:

after receiving the modify connection request from the mobile services switching center, forwarding a modify connection acknowledge message from the media gateway to the mobile services switching center and performing the both-way through-connection.

23. Method of claim 1, wherein exchanging of the address information comprises:

providing a base node address information identifying the base node within the cellular telephone network, providing interface means address information identifying the interface means within the cellular telephone network, transferring the base node address via the first layer to the interface means under control of the first layer in order to establish a through-connection within the second layer for transferring payload information of the call from the interface means to the base node on the basis of the base node address information, providing interface means address information identifying the interface means within the cellular telephone network, and transferring the interface means address information via the first layer to the base node under control of the first layer in order to establish a both-way through-connection within the second layer for transferring payload information of the call from the base node to the interface means on the basis of the base node address information and the interface means address information.

24. Method of claim 23, wherein the base node address information is provided by the base node and the interface means address information is provided by the interface means.

* * * * *